Patented July 17, 1951

2,560,743

UNITED STATES PATENT OFFICE 2,560,743

PRESERVATION OF LATEX

Chester E. Rhines, Glen Rock, N. J., assignor to United States Rubber Company, New York, N. Y., a corporation of New Jersey No Drawing. Application April 13, 1950, Serial No. 155,793

5 Claims. (Cl. 260—820)

1

This invention relates to the preservation of latex.

Latex as it comes from the *Hevea brasiliensis* tree is commonly preserved for export in its normal concentration, as tapped, containing 35% to 45% solids, with 1% to 1.25% of ammonia. Concentrated latices made by creaming the latex by mechanically creaming with a centrifuge, or by chemically creaming with the aid of a hydrophilic colloidal creaming agent, such as a vegetable mucilage, e. g. ammonium alginate, and which may have a 55% to 70% solids concentration, are commonly preserved for export with 0.6% to 1% of ammonia. The term latex as used herein refers to Hevea latex, and if not otherwise restricted, includes normal and concentrated latex. The ammonia in such latex functions both as the basic material for rendering the latex alkaline to the proper degree, and also as a germicidal agent for preventing bacterial growth and the consequent development of acid in the latex which would result in coagulation. While ammonia is a satisfactory base for producing the desired alkalinity, its germicidal properties are so feeble that, if it is to act also as the germicidal agent, it must be used in concentrations greatly in excess of those necessary to otherwise merely obtain a satisfactory alkalinity.

The present invention relates to the preservation of latex with smaller amounts of ammonia than generally used in latex preservation procedures where ammonia is the sole preservative.

In carrying out the present invention, desludged latex is preserved against putrefaction and coagulation by the addition thereto of a small amount of tetraalkali salt of ethylenediamine tetraacetic acid, otherwise called ethylenebis(iminodiacetic) acid, and a small amount of ammonia, or other equivalent base such as alkalimetal hydroxide or mono- or di- or tri-alkylamine. The tetraalkali salt of ethylenediamine tetraacetic acid acts as a germicidal agent for latex which has been desludged to remove materials which would otherwise inactivate the small amounts of ethylenediamine tetraacetic acid salt when used in the present invention. The latex may be desludged in conventional clarifier or desludging centrifuge, which removes the sludge without concentrating the latex, or by settling, or by filtration. Mechanical creaming with a concentrating type of centrifuge will also remove the sludge from the latex as a buttery solid in the concentrating operation. Such desludging of latex is well known. The tetraalkali salt of

2 ethylenediamine tetraacetic acid may be added as such to the latex, or it may be formed in situ in the latex as by adding water-diluted free ethylenediamine tetraacetic acid or mono- or di- or tri-alkali salts of ethylenediamine tetraacetic acid to latex containing ammonia to completely neutralize the same. The term "alkali salt" is used herein in its conventional meaning as including alkali-metal, ammonium and substituted ammonium (i. e., amine) salts, but excluding alkaline-earth and other polyvalent-metal salts. For example, tetra sodium salt, or tetra ammonium salt, or a tetra alkylammonium salt, or a mixed tetraalkali salt of ethylenediamine tetraacetic acid, may be added directly to the latex, or the free ethylenediamine tetraacetic acid, or a mono- or di- or tri-alkali-metal, a mono- or di- or tri-ammonium, or a mono- or di- or tri-alkylammonium salt may be added to the latex containing ammonia which will readily neutralize any carboxyl radicals. For the preservation of the latex according to the present invention, the alkali salt of ethylenediamine tetraacetic acid should be in amount from 0.002 to 0.2 part per 100 parts of the latex (i. e., 0.002% to 0.2%). The amount of ammonia is less than that which of itself would preserve the latex and will be from 0.2 to 0.5 part of free ammonia per 100 parts of the latex (i. e., 0.2% to 0.5%). All parts and percentages referred to herein are by weight. The combination of tetraalkali salt of ethylenediamine tetraacetic acid and ammonia may be used to preserve fresh latex as it comes from the trees, or after concentration, as by mechanical or chemical creaming, for shipment to various countries. The combination may also be used to preserve latex that has already been exported from plantation countries with another type of preservative, after such latex has been freed from part or all of its original preservative. Thus where it is desired to reduce the ammonia content of a latex preserved wholly by ammonia so that it can be used in manufacturing processes with a low ammonia content which would not of itself preserve the latex on standing or storage before use, the ammonia content may be reduced to 0.2% to 0.5%, or to substantially zero, and bacterial decomposition prevented by addition to the latex of 0.002 to 0.2% of tetraalkali salt of ethylenediamine tetraacetic acid.

The present invention is illustrated in the following examples:

*Example I*

To portions of a desludged and centrifuged latex of 63% solids concentration, and which had a KOH number of 0.44, were added 0.25% of ammonia (NH₃) alone, and 0.25% of ammonia together with 0.02%, 0.05% and 0.1% of the dimethylammonium salt of ethylenediamine tetraacetic acid (percentages based on the concentrated latex). The "KOH number" is the number of grams of KOH per 100 grams of latex solids corresponding to the end point in the electrometric titration of the latex. (Reference, "The KOH Number Test and Its Application to the Compounding of Zinc Oxide in Rubber Latex," by H. F. Jordan, Paper No. 51 in Proceedings of the Rubber Technology Conference, May 23–25, 1938, at London, England, pages 111 to 125; pub. by W. Hoffer & Sons Ltd., Cambridge, England.) Substantial increase in KOH number of a preserved latex on standing a few weeks shows incomplete preservation of the latex with consequent increase in KOH titratable acidic material. After standing three weeks, the KOH number of the portion of the latex to which only 0.25% of ammonia had been added was 0.80 and the latex had developed a foul odor. The portions of the latex to which 0.25% of ammonia and 0.02%, 0.05% and 0.1% of dimethylamine salt of ethylenediamine tetraacetic acid had been added did not develop a foul odor and the KOH numbers were 0.50, 0.50 and 0.44 respectively, showing effective preservation.

*Example II*

A fresh latex was desludged and creamed with a small amount of ammonium alginate in the presence of a small amount of ammonia. The cream concentrate had a 66% solids concentration and contained 0.28% of NH₃. One portion of the cream was allowed to stand without further addition, and to another portion was added 0.1%, based on the latex, of the tetrasodium salt of ethylenediamine tetraacetic acid.

On standing three weeks the KOH number of the latex containing only the 0.28% of NH₃ was 0.66, whereas the KOH number of latex containing the 0.28% of ammonia and 0.1% of the ethylenediamine tetraacetic acid salt was 0.52. On standing one month, the KOH number of the latex containing only the 0.28% of NH₃ was 0.73 whereas the KOH number of the latex containing both the ammonia and tetrasodium salt of ethylenediamine tetraacetic acid was 0.56.

In view of the many changes and modifications that may be made without departing from the principles underlying the invention, reference should be made to the appended claims for an understanding of the scope of the invention.

Having thus described my invention, what I claim and desire to protect by Letters Patent is:

1. Desludged Hevea rubber latex preserved with a small amount of tetraalkali salt of ethylenediamine tetraacetic acid and 0.2% to 0.5% of ammonia based on the latex, the amount of tetraalkali salt of ethylene diamine tetraacetic acid being less than the amount of ammonia, and the ammonia being in amount less than that which of itself would preserve the latex.

2. Desludged Hevea rubber latex preserved with 0.002% to 0.2% of tetraalkali salt of ethylenediamine tetraacetic acid and 0.2% to 0.5% of ammonia, said percents being based on the latex, and said ammonia being in amount less than that which of itself would preserve the latex.

3. Desludged Hevea rubber latex preserved with 0.002% to 0.2% of tetraalkali salt of ethylenediamine tetraacetic acid and less than 0.5% of ammonia, said percents being based on the latex, and said ammonia being in amount less than that which of itself would preserve the latex.

4. Desludged Hevea rubber latex cream concentrate preserved with 0.002% to 0.2% of tetraalkali salt of ethylenediamine tetraacetic acid and 0.2% to 0.5% of ammonia, said percents being based on the latex cream, and said ammonia being in amount less than that which of itself would preserve the latex.

5. Desludged Hevea rubber latex cream concentrate preserved with 0.002% to 0.2% of tetraalkali salt of ethylenediamine tetraacetic acid and less than 0.5% of ammonia, said percents being based on the latex cream, and said ammonia being in amount less than that which of itself would preserve the latex.

CHESTER E. RHINES.

REFERENCES CITED

The following references are of record in the file of this patent:

UNITED STATES PATENTS

| Number | Name | Date |
|---|---|---|
| 2,063,982 | Bunbury et al. | Dec. 15, 1936 |
| 2,126,268 | McGavack | Aug. 9, 1938 |
| 2,444,801 | Arundale | July 6, 1948 |